(12) United States Patent
Castro Salinas et al.

(10) Patent No.: US 9,915,396 B2
(45) Date of Patent: Mar. 13, 2018

(54) COLUMN-LEVELLING SYSTEM

(71) Applicant: Moisés Castro Salinas, Coacalco de Berriozabal (MX)

(72) Inventors: Moisés Castro Salinas, Coacalco de Berriozabal (MX); Fabián Moisés Castro Vargas, Coacalco de Berriozabal (MX)

(73) Assignee: Moisés Castro Salinas, Coacalco de Berriozabal (MX)

( * ) Notice: Subject to any disclaimer, the term of this patent is extended or adjusted under 35 U.S.C. 154(b) by 0 days.

(21) Appl. No.: 14/898,244

(22) PCT Filed: Jan. 31, 2014

(86) PCT No.: PCT/MX2014/000038
§ 371 (c)(1),
(2) Date: Dec. 14, 2015

(87) PCT Pub. No.: WO2015/115882
PCT Pub. Date: Aug. 6, 2015

(65) Prior Publication Data
US 2016/0138756 A1    May 19, 2016

(51) Int. Cl.
*F16M 13/00* (2006.01)
*F16M 13/02* (2006.01)
*B66F 11/04* (2006.01)

(52) U.S. Cl.
CPC ......... *F16M 13/022* (2013.01); *B66F 11/044* (2013.01)

(58) Field of Classification Search
CPC ........ B66F 11/044; B66F 11/04; B66F 17/006
See application file for complete search history.

(56) References Cited

U.S. PATENT DOCUMENTS

| 3,575,262 | A | * | 4/1971 | Way | B66F 11/044 182/141 |
|---|---|---|---|---|---|
| 5,868,218 | A | * | 2/1999 | Lawson | B66F 11/044 182/2.2 |
| 8,187,045 | B2 | * | 5/2012 | Thibodaux | B63B 27/06 440/37 |
| 2004/0066010 | A1 | | 4/2004 | Laursen | |

FOREIGN PATENT DOCUMENTS

| CN | 103072926 A | 5/2013 |
|---|---|---|
| DE | 29802248 U1 | 6/1998 |
| JP | 858462 A | 3/1996 |
| WO | 02070323 A1 | 9/2002 |

* cited by examiner

*Primary Examiner* — Amy J. Sterling
(74) *Attorney, Agent, or Firm* — The Webb Law Firm

(57) ABSTRACT

A system for levelling the column of a bucket truck, including a hydraulic cylinder, fulcrums for the cylinder located on a substructure, and a pedestal, and a pivot point for the pedestal allowing the column of the crane and a turntable to be positioned at 0° in relation to the horizontal plane, thereby increasing the working slope range both in the forward and backward direction up to 20° in relation to the chassis of the carrying vehicle.

7 Claims, 4 Drawing Sheets

COLUMN-LEVELLING SYSTEM

CROSS-REFERENCE TO RELATED APPLICATION

This application is the United States national phase of International Application No. PCT/MX2014/000038 filed Jan. 31, 2014, the disclosure of which is hereby incorporated in its entirety by reference.

FIELD OF THE INVENTION

The present invention relates generally to a column-levelling system for the articulated arm of a crane, and more particularly to a novel system for levelling the column of a bucket truck normally at 0° in relation to the chassis, thus overcoming slopes up to 20° both in the forward and backward direction, assuming that the chassis is at an angle.

BACKGROUND OF THE INVENTION

It is common practice of public and private services the use of lifting systems to maintain their facilities. These systems can be divided into two big groups: first are the fixed systems, which are those installed in the workplace and consist of a series of modular structures assembled (scaffolds), joined together to build the support on which the workers perform his duties. These systems are placed on the ground surface, and are fitted to the unevenness of the terrain through a series of supports with variable height and wedge-type devices.

The disadvantage of this first group of systems is that they require to be disassembled for being translated from a workplace to another, which implies loss of time both in assembling-disassembling process and moving.

On the other hand, there are the self-propelled systems, which are those mounted on a chassis that allows to move them to the workplace; these systems have the advantage of not requiring to be disassembled, so that the operation times are shorter in comparison with the modular systems.

The main drawback of the latter type of systems is that they require to be leveled to keep the stability and avoid rollovers, since the supporting area is smaller that of the fixed systems. Also, the use thereof in areas where the ground is not leveled is restricted by the chassis frame and the type of carrying vehicle (tracked built-in systems, attached to trucks, on not self-propelled chassis, etc.)

Among this type of self-propelled systems, the bucket trucks stand out, since being mounted on a vehicle chassis (such as a truck, a pick-up, or a tracked vehicle), they allow the worker to easily move them between different workplaces, being the systems mounted on vehicles complying with traffic regulations in public roadways those with greater autonomy and flexibility. However, to date its usefulness is limited because the axis of the crane arm must be leveled in relation to the horizontal plane, in order to provide stability to the system and prevent an excessive wear thereof. Usually this type of lifting systems are not designed to work in a steep slope, which severely limits its use in rough terrains or in urban areas located in the slopes of ground elevations.

Currently, as a rule an articulated bucket truck cannot operate at more than 5 degrees of tilt, since its stability is compromised when the center of gravity is displaced outside the chassis frame, thereby increasing the risk of rollovers and undesired swinging. Also, the bearings that allow the articulated arm to move suffer a greater wear when operating on slopes, wo that the useful life of such systems results severely reduced when compared to those that operate in leveled locations.

SUMMARY OF THE INVENTION

In view of the above described issues, the column-levelling system of the invention aims to provide a system for a bucket truck that solves the drawbacks of the existent systems, allowing the crane to safely operate in slopes up to 20° with respect to the horizontal plane.

A particular object of the column-levelling system of the present invention is to provide a levelling system that allows the turntable of the column to return to 0° with respect to the horizontal plane.

Another object of the present invention is to provide a levelling system that allows the column of a bucket truck to be leveled, both in the forward and backward direction with respect to the front of the chassis of the carrying vehicle.

A further object of the present system is to provide a simple, easy-to-construct levelling system that allows the operator to select the angle of inclination of the column in a bucket truck.

The above objects, as well as other, and the advantages of the present invention shall become apparent from the following detailed description thereof.

DESCRIPTION OF THE FIGURES OF THE INVENTION

The present invention will be described below in detail with reference to the accompanying Figures, in which the same numerals are used to illustrate the same elements.

DETAILED DESCRIPTION OF THE INVENTION

Figure 1:
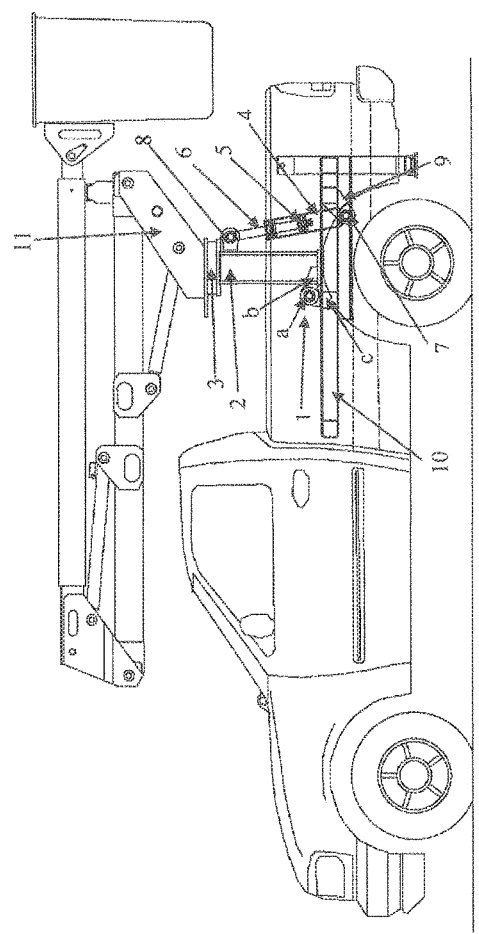
FIG. 1 is a side view of a bucket truck including the levelling system of the present invention operating in a 0 degree slope.
Figure 2:
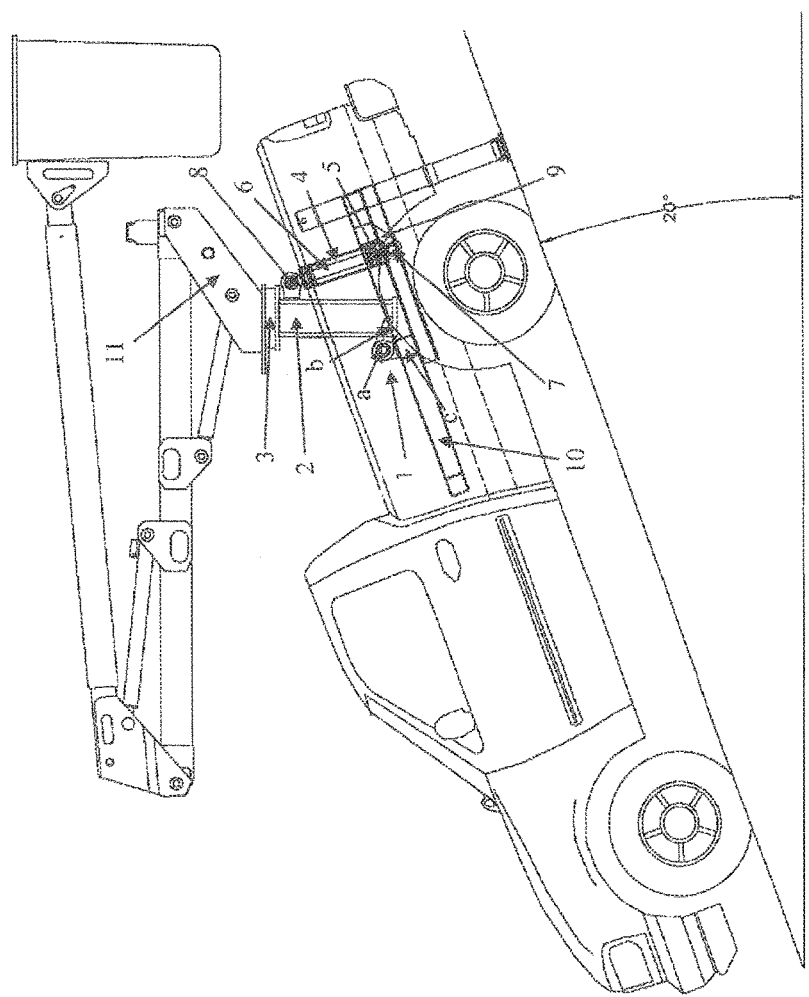
FIG. 2 is a side view of a bucket truck including the levelling system of the present invention operating in a 20° front slope.
Figure 3:
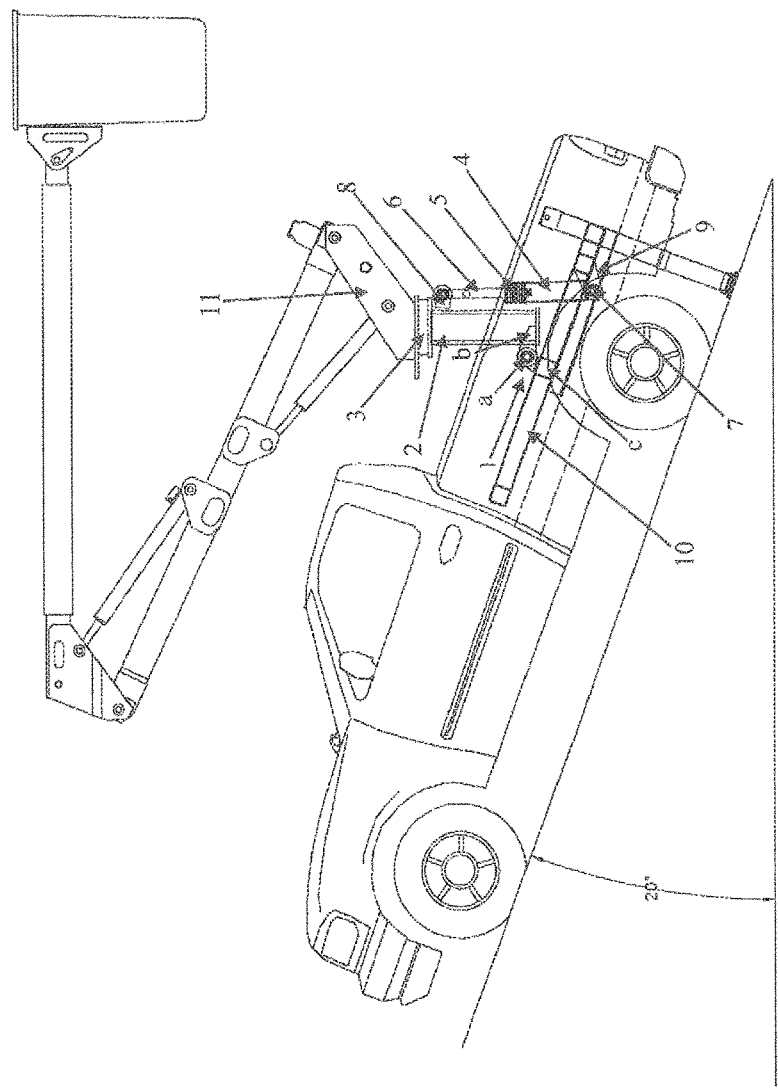
FIG. 3 is a side view of the bucket truck as illustrated in FIG. 2, operating in a 20° rear slope.
Figure 4:
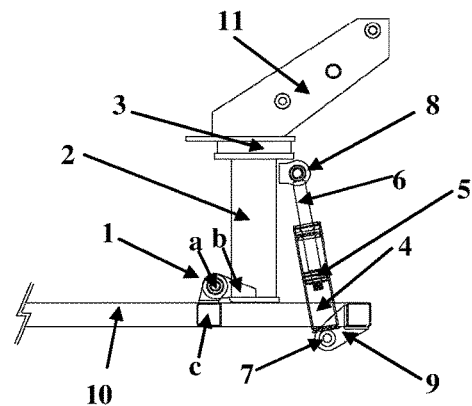
FIG. 4 is a schematic view of the levelling system of the present invention, showing its constituent elements in operating position in leveled surfaces.
Figure 5:
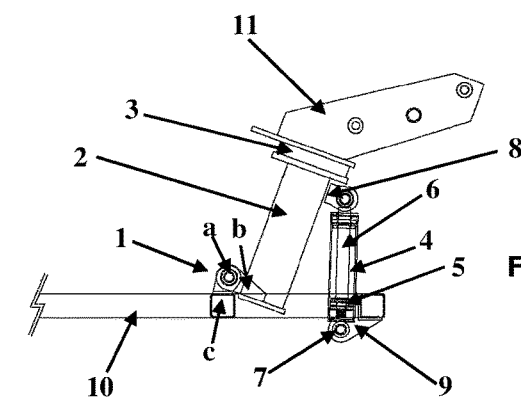
FIG. 5 is a schematic view of the levelling system of the present invention, showing its constituent elements in operating position in surfaces with a rear slope.
Figure 6:
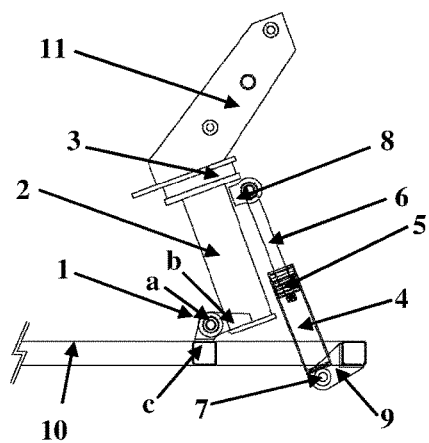
FIG. 6 is a schematic view of the levelling system shown in FIGS. 4 and 5, in operating position in surfaces with front slope.

As best seen in FIGS. 4, 5, and 6, the column-levelling system of the invention aims at allowing to keep the stability of the articulated arm (11) of a bucket truck by means of a hydraulic actuator system, which allows a column comprising a pedestal (2) and a turntable (3) to be moved from a supporting mechanism (1) up to 20° with respect to the vertical plane. The supporting mechanism (1) comprises a pivot point or fulcrum (a), a first supporting flange (b) attached to a substructure (10), and a second supporting flange (c) fixedly attached to the bottom of the pedestal (2), preferably, but without limitation, with welding. The movement of the pedestal (2) and the turntable (3) is assured by the hydraulic actuator system comprising a hydraulic cylinder (4) having a piston (5) coupled to the rod (6), which is received in the distal end by the thrust point (8) that is attached to the top of the pedestal (2). The hydraulic cylinder (4) in turn has a head (7) connected to the support (9) disposed on the substructure.

The stroke of the piston (5) allows the movement of all the assembly of the column-levelling system, so that when it is at halfway of the hydraulic cylinder (4), the pedestal (2) is in a 90° angle in relation to the horizontal plane formed by the substructure (10), thus allowing the operation of the bucket truck in plain terrain. When the piston (5) is in the higher point of its stroke, the pedestal (2) forms a frontal 70° angle in relation to the horizontal plane formed by the substructure (10), thus allowing the pedestal (2) and the turntable (3) to return to the horizontal with respect to the working ground, counteracting a front slope up to 20°. As well, when the piston (5) is in the lower point of its stroke, the pedestal (2) forms rear angle of 70° from the horizontal formed by the substructure (1), allowing the pedestal (2) and the turntable (3) to return to the horizontal plane with respect to the working ground, thus counteracting a rear slope up to 20°.

The stroke of the piston (5) therefore assures a total run up to 40° from the pedestal (2), so that it can easily overcome slopes up to 20° in both directions of movement, greatly facilitating the operation of bucket trucks, since it is not required to turn the carrier vehicle to start maneuvers, which allows the truck entering the workplace with the cabin in a forward or reverse direction.

The present invention has been described in connection to a preferred embodiment; however, it will be apparent to one skilled in the art that modifications may be made thereto without departing from the spirit and scope of the invention.

The invention claimed is:

1. A column-levelling system for a bucket truck, comprising a substructure, a supporting mechanism for a pedestal, a column with a pedestal and a turntable, and; a hydraulic actuator, wherein said column-levelling system comprises a first supporting flange, a pivot point or fulcrum, and a second supporting flange, arranged on the supporting mechanism; the first supporting flange is attached to the substructure, while the second supporting flange is fixedly attached to the bottom of the pedestal; a hydraulic cylinder arranged in the hydraulic actuator with a piston coupled on one end to a rod, and on the other side connected to a thrust point that is connected to the top of the pedestal; and a supporting head arranged in the hydraulic cylinder and connected to a support on the substructure; the pedestal is connected on its bottom to the supporting mechanism, and on its top to the hydraulic actuator, so that the piston stroke along the hydraulic cylinder allows the pedestal to move 40° on the supporting mechanism, thus counteracting slopes up to 20° in both directions with respect to the working ground to return the pedestal and turntable to a horizontal plane (0°) regardless of the slope of the working ground or the substructure.

2. The system according to claim 1, wherein the working angle with respect to the ground surfaces is between 0° and 20° in the forward direction, and between 0° and 20° in the rear direction.

3. The system according to claim 1, wherein said system is mounted on a substructure.

4. The system according to claim 3, wherein the substructure is on a carrying vehicle.

5. The system according to claim 4, wherein the carrying vehicle is a self-propelled vehicle.

6. The system according to claim 5, wherein the self-propelled vehicle is selected from the list consisting of trucks, pick-ups, and tracked vehicles.

7. A column-levelling system for a bucket truck, comprising:
   a substructure;
   a supporting mechanism comprising a first flange pivotally connected to a second flange, wherein the first flange is attached to the substructure;
   a column having a top and a bottom, the second flange attached to the bottom of the column;
   a turntable at the top of the column;
   an hydraulic actuator;
   an hydraulic cylinder arranged in the hydraulic actuator with a piston coupled on one end to a rod, and on the other side connected to a thrust point that is connected to the top of the pedestal; and
   a supporting head arranged in the hydraulic cylinder and connected to a support on the substructure,
   wherein the piston stroke along the hydraulic cylinder allows the pedestal to move 40° on the supporting mechanism, thus counteracting slopes up to 20° in both directions with respect to the working ground.

* * * * *